United States Patent
Fischer et al.

(10) Patent No.: US 10,107,214 B2
(45) Date of Patent: Oct. 23, 2018

(54) CONTROL SYSTEM AND METHOD USING EXHAUST GAS TEMPERATURES TO ADJUST AN AIR/FUEL MIXTURE FOR AN INTERNAL COMBUSTION ENGINE

(71) Applicant: Robert Bosch GmbH, Stuttgart (DE)

(72) Inventors: Wolfgang Fischer, Gerlingen (DE);
Nikhil Ravi, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 430 days.

(21) Appl. No.: 14/928,232

(22) Filed: Oct. 30, 2015

(65) Prior Publication Data
US 2016/0053698 A1  Feb. 25, 2016

Related U.S. Application Data

(63) Continuation-in-part of application No. 14/529,632, filed on Oct. 31, 2014, now Pat. No. 9,816,865.
(Continued)

(51) Int. Cl.
*F02D 41/00* (2006.01)
*G01J 5/04* (2006.01)
(Continued)

(52) U.S. Cl.
CPC ....... *F02D 41/008* (2013.01); *F02D 41/1446* (2013.01); *F02D 41/1458* (2013.01);
(Continued)

(58) Field of Classification Search
CPC ............... F02D 41/0082; F02D 41/005; F02D 41/2454; F02D 41/1446; F02D 2200/0614;
(Continued)

(56) References Cited

U.S. PATENT DOCUMENTS 5,117,631 A   6/1992 Moser
5,131,371 A   7/1992 Wahl et al.
(Continued)

FOREIGN PATENT DOCUMENTS

DE         19811257 A1   9/1999
DE   10 2009 001 165 A1   9/2010
(Continued)

OTHER PUBLICATIONS

International Search Report and Written Opinion corresponding to PCT Application No. PCT/US2016/059717 (9 pages)

*Primary Examiner* — Gail Kaplan Verbitsky
(74) *Attorney, Agent, or Firm* — Maginot Moore & Beck LLP

(57) ABSTRACT

A control system for an internal combustion engine includes a temperature sensor and an engine controller. The sensor measures the temperature of exhaust gas passing through an exhaust manifold of the engine during each cycle. The controller selectively operates the engine in a first state and a second state. In the first, normal state, a quantity of fuel based on an open loop fuel mass command value is injected into the engine each cycle. In the second state, the controller determines a temperature of the exhaust gas during a normal cycle, injects the quantity and additional fuel into the engine during a second cycle, determines the temperature of the exhaust gas during the second cycle, compares the temperatures, and adjusts the command value for fuel to be injected each cycle when operating the engine in the first state.

20 Claims, 7 Drawing Sheets

Related U.S. Application Data

(60) Provisional application No. 61/897,852, filed on Oct. 31, 2013.

(51) Int. Cl.
*G01J 5/00* (2006.01)
*G01J 5/08* (2006.01)
*F02D 41/14* (2006.01)

(52) U.S. Cl.
CPC .............. *G01J 5/0014* (2013.01); *G01J 5/048* (2013.01); *G01J 5/0887* (2013.01); *F01N 2560/06* (2013.01); *F02D 41/1477* (2013.01)

(58) Field of Classification Search
CPC ............... F02D 41/008; F02D 41/1458; F02D 41/1477; F02D 41/2461; F02D 41/34; Y02T 10/47; Y02T 10/44; Y02T 10/54; G01K 13/00; G01K 1/02; G01K 2201/02; G01M 15/048; G01N 33/22; G01N 2291/02881; G01N 27/407; F01N 2560/06; F01N 13/008; F01N 13/10; F01N 11/002; G01J 5/0014
See application file for complete search history.

(56) References Cited

U.S. PATENT DOCUMENTS

| | | | |
|---|---|---|---|
| 5,677,533 A | 10/1997 | Yaktine et al. | |
| 6,422,007 B1 * | 7/2002 | Hartick | B01D 53/9422 60/298 |
| 7,240,660 B1 * | 7/2007 | Bryant | F02D 41/0087 123/299 |
| 7,258,107 B2 | 8/2007 | Johnson et al. | |
| 7,461,545 B2 | 12/2008 | Gardiner | |
| 2011/0214649 A1 * | 9/2011 | Imamura | F02B 19/108 123/673 |
| 2013/0104626 A1 * | 5/2013 | Levijoki | F02D 41/1454 73/23.32 |
| 2015/0203100 A1 * | 7/2015 | Whitney | B60W 10/06 701/22 |
| 2015/0247469 A1 | 9/2015 | Joshi | |
| 2017/0226944 A1 * | 8/2017 | Glugla | F02D 41/0087 |

FOREIGN PATENT DOCUMENTS

| | | | |
|---|---|---|---|
| EP | 696708 A1 * | 7/1995 | |
| JP | 2007016783 A | 1/2007 | |
| KR | 2013132141 A * | 5/2012 | |

* cited by examiner

CONTROL SYSTEM AND METHOD USING EXHAUST GAS TEMPERATURES TO ADJUST AN AIR/FUEL MIXTURE FOR AN INTERNAL COMBUSTION ENGINE

CROSS REFERENCE TO OTHER APPLICATIONS

This application is a Continuation in Part of the U.S. patent application Ser. No. 14/529,632, entitled "SYSTEM AND METHOD FOR REMOTE TEMPERATURE MEASUREMENT IN A HARSH ENVIRONMENT" and filed Oct. 31, 2014, which claims priority to U.S. Provisional Application No. 61/897,852 entitled "SYSTEM AND METHOD FOR REMOTE TEMPERATURE MEASUREMENT IN A HARSH ENVIRONMENT" and filed Oct. 31, 2013, the entireties of which are incorporated herein by reference.

TECHNICAL FIELD

This disclosure relates generally to the field of temperature measurement, and, more particularly, to control systems and temperature sensors for automotive exhaust systems.

BACKGROUND

Temperatures are measured in many industrial and commercial systems and processes to provide desired conditions in which the systems and processes operate. By accurately measuring the temperatures of the systems and industrial processes, associated equipment can operate at an optimum efficiency. Temperature measurements made for a combustion engine can be particularly critical, since the efficiency of the engine can be directly related to the temperature at which the engine operates.

Some applications for temperature sensing present a harsh or extreme environment which can affect the capability of a temperature sensor to accurately determine a temperature. For example, in some types of combustion engines, the temperature of the engine exhaust can provide an accurate indicator of the operating conditions of the engine. However, due to the harsh environment of the exhaust gas, the temperature sensing systems and the temperature sensors themselves, require robust packaging to prevent the extreme environment from affecting the temperature measurement. Highly complex packaging to protect the system or sensor can be required. Unfortunately, packaging of this type, while effective, can be costly or complex. In addition, additional electrical circuitry and the associated wiring may be needed to transmit the electrical temperature signals in an extreme environment. As a result, there are a relatively few currently available temperature sensors which can be used for such extreme applications.

Commercially available temperature sensors are known which measure temperatures at predetermined discrete periods of time, typically on the order of every few seconds or more. Such discrete measurement time periods can be too long for certain types of applications, and are therefore not suitable for fast, cycle-by-cycle temperature measurements. In particular, discrete time measurements, on the order of every few seconds, are not useful for control of advanced combustion strategies such as Homogeneous Charge Compression Ignition (HCCI) and Spark Assisted Compression Ignition (SACI) used in combustion engines.

Internal combustion engines compress and burn a quantity of an air/fuel mixture in each engine cylinder during successive engine cycles. If just enough air is present in order to burn all of the fuel, the air/fuel mixture is described as being a stoichiometric mixture. For customary internal combustion engines, the stoichiometric ratio of air to fuel is generally in a range of about 10-20 to 1 by weight depending on the type of fuel and other factors. If a greater proportion of air than for the stoichiometric mixture is present, the mixture is described as lean, and if a smaller proportion of air is present, the mixture is described as rich. An air-fuel equivalence ratio, lambda, is a normalized representation of the air/fuel mixture expressed as the ratio between an actual or measured air/fuel mix to the stoichiometric mix, and thus a stoichiometric mixture has a lambda equal to 1, a rich mixture has a lambda less than 1, and a lean mixture has a lambda greater than 1.

The lambda value of the air/fuel mixture burned in an engine cycle can impact the output torque and speed stability of the engine, a load-balancing between different engine cylinders, engine vibration levels, exhaust emissions produced by the engine, and the temperature of the exhausted gasses, as well as other factors. For example, a greater proportion of nitrogen oxide emissions are produced from combusting a lean mixture, and a greater proportion of other emissions such as carbon monoxide are produced from combusting a rich mixture. Thus, the operability, efficiency, and environmental impact of an engine can be improved by adequately controlling the lambda values of the air/fuel mixture supplied to the engine. However, the conversion from lean to stoichiometric to rich takes place over a narrow range of lambda values, which requires precise control of the lambda value.

U.S. Pat. No. 5,117,631 describes a method and apparatus for controlling the lambda value for the air/fuel mixture to be metered to an internal combustion engine. When a reference includes terms that are similar to terms used herein, the meaning of the terms as set forth herein controls. In U.S. Pat. No. 5,117,631, a control process includes alternating between increasing and decreasing the lambda value of the air/fuel mix so as to oscillate around a desired time-averaged value. However, since the lambda is controlled on a time-averaged basis, cycle-by-cycle variations may be present which can impact the characteristics of the engine.

Because the lambda value of a mixture directly relates to an oxygen quantity in the exhaust products of the combustion process, lambda control systems have been made which use lambda probes, or probes that sense an oxygen content of exhaust gasses produced by the engine. Combustion control systems have also been made which utilize thermocouple temperature sensors to sense the temperature of the exhaust gasses, since lean mixtures tend to burn hotter and rich mixtures cooler than stoichiometric mixtures. However, the time-constant for the response time of these types of sensors are generally too long to both take a temperature reading and adjust the lambda value of the mixture during a single engine cycle, since a single engine cycle may be on the order of milliseconds depending on the operating state of the engine.

U.S. Pat. No. 7,461,545 describes a method for monitoring cyclic variability in a reciprocating engine by analyzing exhaust gas temperature sensor signals. The method utilizes a modified thermocouple temperature sensor that is configured to have a reduced signal response time so as to enable cycle-by-cycle temperature readings of the exhaust gasses which can be fed to an engine control system. However, the resulting modified sensors may be expensive to produce and maintain, especially since the modified sensor is positioned directly in the harsh environment of the exhaust gas stream. Additionally, when the resulting measurements between various cycles differ by relatively small temperature values, adequate control of the engine may be difficult without complex filtering and analysis of the sensor values.

Other types of temperature sensors which have a shorter signal response time have been developed, such as bolometers, but such sensors are not optimized to withstand the harsh environment of the exhaust gas.

Therefore, there is a need for a fast temperature sensor that can withstand the harsh environment of an exhaust of an internal combustion engine and that is usable for cycle-by-cycle measurements of an exhaust gas, and for an engine control system that is optimized for cycle-by-cycle lambda control.

SUMMARY

The following is a brief summary of subject matter that is described in greater detail herein. This summary is not intended to be limiting as to the scope of the claims.

Using an infrared based contactless temperature sensor, the temperature of gases in a harsh environment such as the engine exhaust can be measured remotely on a cycle-by-cycle basis, without the need for complex packaging and costly wiring/electrical connections to the outside environment. The temperature inside the environment is measured using a sealed probe. The sealed probe is substantially at the same temperature as the environment and the temperature of the sealed probe is measured using an infra-red temperature sensor. This enables the sensor element to be placed physically apart from the high temperature environment such as a region in the path of exhaust gas. Therefore, conventional packaging and standard signal conditioning can be applied. The infrared based sensor advantageously has a time constant in the order of milliseconds, allowing very fast measurements of temperature. The described system, method, and device are effectively usable in automotive applications, as well as a wide variety of industrial uses.

In one embodiment, a temperature sensing device includes a probe unit and a sensor unit. The probe unit is configured to be positioned within an environment such that a temperature of the probe unit corresponds to a temperature of the environment. The sensor unit is spaced apart from the probe unit such that when the probe unit is positioned within the environment, the sensor unit is not positioned within the environment. The sensor unit is configured to sense the temperature of the probe unit, and generate an electrical signal indicative of the sensed temperature of the probe unit.

The device further includes a sealed housing that has a first end, a second end opposite the first end, and an interior between the first end and the second end. The probe unit closes off the first end of the housing such that the interior of the housing is sealed off from the environment. The sensor unit is mounted on a side of the second end that faces the interior.

The probe unit emits infra-red radiation with reference to the temperature of the probe unit. The sensor unit includes an infra-red sensor configured to sense the infra-red radiation emitted by the probe unit, and the electrical signal generated by the sensor unit is generated with reference to the sensed infra-red radiation. Advantageously, the temperature sensing device has a time constant in the order of milliseconds. In one embodiment, the sensor unit includes a MEMS bolometer.

A temperature measuring system for use with an engine that has an exhaust pipe configured to exhaust gas generated by the engine includes a temperature sensing device as described above that is operatively connected to a processor configured to determine a sensed temperature of the exhaust gas with reference to the electrical signal. An engine controller is operatively connected to the processor and the engine, and is configured to control the engine with reference to the sensed exhaust gas temperature on a cycle-by-cycle basis.

In an embodiment, the probe unit is configured such that a change in the temperature of the environment induces a change in the temperature of the probe within a time period on the order of milliseconds. The determination of the sensed temperature of the environment can be repeated for at least one following time period in order to collect cycle-by-cycle data of the temperature of the environment that is usable to facilitate advanced combustion strategies such as Homogeneous Charge Compression Ignition (HCCI) and Spark Assisted Compression Ignition (SACI).

In order to facilitate cycle-by-cycle regulating of the lambda value of the air/fuel mixture for an internal combustion engine, an engine control system includes a temperature sensor and an engine controller. The temperature sensor has a fast response time on the order of milliseconds that enables cycle-by-cycle measurements, and is configured to generate a signal indicative of a temperature of exhaust gas passing through an exhaust manifold of the engine. The engine controller is configured to selectively operate the engine in a first state and a second state. For operation in the first state, the engine controller is configured to operate a fuel injector for the engine to inject a quantity of fuel into the engine corresponding to an open loop fuel mass command value. For operation in the second state, the engine controller is configured to determine a first temperature of the exhaust gas based on the signal generated by the temperature sensor during a first engine cycle at which the quantity of fuel is injected into the engine, operate the fuel injector to inject the quantity of fuel along with an additional amount of fuel into the engine during a second engine cycle, determine a second temperature of the exhaust gas based on the signal generated by the temperature sensor during the second engine cycle, compare at least the first temperature and the second temperature, and adjust the open loop fuel mass command value based on the comparison.

A method that facilitates cycle-by-cycle lambda control for an internal combustion engine includes configuring a temperature sensor to generate a signal indicative of a temperature of exhaust gas passing through an exhaust manifold of the engine. A quantity of fuel based on an open loop fuel mass command value is injected into the engine during a first engine cycle, and a first temperature of the exhaust gas is determined based on the signal during the first engine cycle. During a second engine cycle, both the quantity and an additional amount of fuel are injected into the engine, and a second temperature of the exhaust gas is determined. The first and second temperatures are compared, and the open loop fuel mass command value is adjusted based on the comparison.

When the second temperature is greater than the first temperature, the air/fuel mixture of the engine is lean, and the adjustment includes increasing the open loop fuel mass command value in order to increase the quantity of fuel injected during the first engine cycle. When the first temperature is greater than the second temperature, the air/fuel mixture of the engine is rich, and the adjustment includes decreasing the open loop fuel mass command value in order to decrease the quantity of fuel injected during the first engine cycle. The adjustment is configured to regulate the lambda value of the air/fuel mixture of the engine toward 1 on a cycle-by-cycle basis.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one of ordinary skill in the art to which this document pertains.

Figure 1:
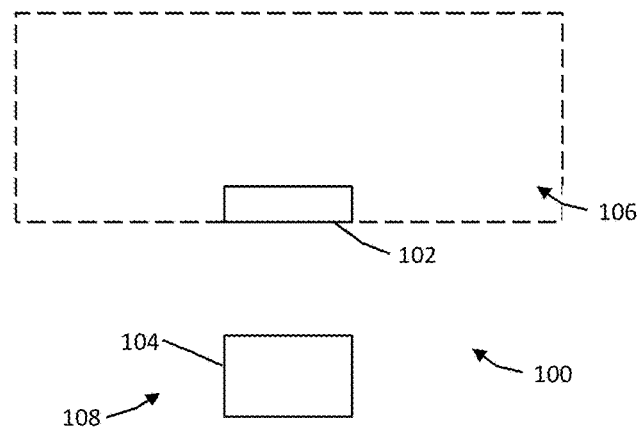
FIG. 1 is a schematic block diagram of a temperature sensing device according to the disclosure.

FIG. 1 is a schematic block diagram of a temperature sensing device 100 according to the disclosure. The device 100 includes a probe unit 102 and a sensor unit 104. The probe unit 102 is positioned such that it is located substantially within an environment 106 to be measured. The probe unit 102 is exposed to a temperature of the environment 106, and is configured to achieve a temperature that corresponds to the temperature of the environment. The sensor unit 104 is positioned such that it is located in a region 108 outside of the environment 106. Consequentially, the sensor unit 104 is at least partially insulated from the temperature of the environment 106.

The sensor unit is configured to sense the temperature of the probe unit 102, and is further configured to generate an electrical signal indicative of the temperature of the probe unit 102. In an embodiment, the probe unit is configured to absorb heat from the environment 106 and emit infra-red radiation in response to the temperature of the environment 106, whereby the infra-red radiation is at least partially directed at the sensor unit 104. The sensor unit 104 is configured to detect the infra-red radiation generated from the heat absorbed by the probe unit 102 from the environment 106.

In one aspect of the disclosure, the environment 106 is a harsh or extreme environment having a high temperature relative to a temperature of the region 108 outside of the environment 106. Since the temperature of the region 108 is low compared to the temperature of the environment 106, infra-red emissions from the region 108 do not have a significant effect on temperature measurements of the sensor unit 104. Additionally, any excess heat retained by the probe unit 102, for example when the temperature of the environment 106 drops, can be dissipated into the region 108 or the environment 106. Advantageously, because the sensor unit 104 is spaced apart from the environment 106, conventional electronic connection and packaging practices are usable for providing the sensor unit 104 in the device 100 without a risk of damage or inaccurate measurements.

Figure 2:
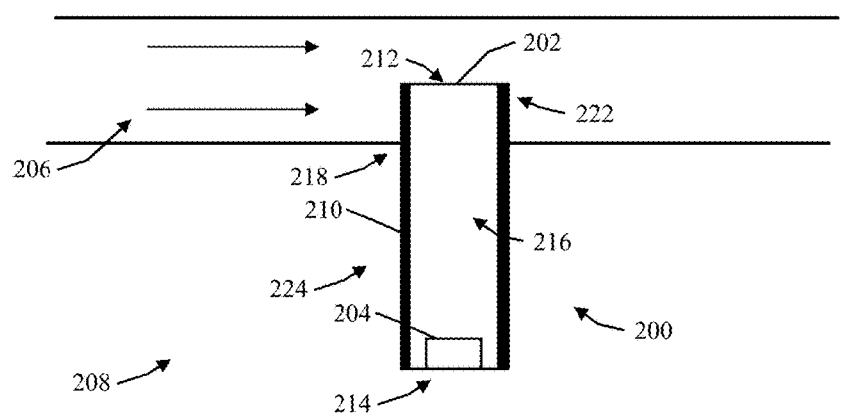
FIGS. 2-4 are schematic illustrations of different embodiments of temperature sensing devices according to the disclosure.

FIG. 2 illustrates an exemplary embodiment of a temperature sensing device 200 that includes a housing 210, a probe unit 202, and a sensor unit 204. The probe unit 202 closes off a first end 212 of the housing 210, and the sensor unit 204 is mounted on a side of a second end 214 of the housing 210 that faces an interior 216 of the housing 210 defined by the first end 212 and the second end 214. In an embodiment, the housing 210 is a hollow tube having a substantially cylindrical shape, although other shapes for the housing 210 are also contemplated. The device 200 is positioned such that a first portion 222 that includes the probe unit 202 is positioned within an environment 206 that is desirably measured, and such that a second portion 224 that includes the sensor unit 204 is positioned in a region 208 outside of the environment 206. In one aspect, the interior 216 of the housing 210 is sealed off from at least one of the environment 206 and the region 208 such that, for example, gasses, debris, or other materials are prevented from entering the interior 216 that might otherwise contaminate or damage the sensor unit 204.

In an example, the environment 206 is a pipe directing a hot fluid, such as an exhaust pipe directing exhaust gas away from an engine. The housing 210 thus extends through an aperture 218 in a wall of the pipe 206. The first portion 222 extends into the exhaust pipe 206 such that the probe unit 202 is located substantially in a middle of a channel defining a flow path of the pipe 206, although other locations are also contemplated. In an embodiment, the probe unit 202 is located beyond a laminar boundary region of gas flowing within the pipe 206. Because the second portion 224 is located outside of the flow path of the pipe 206, the second portion 224, and thereby the sensor unit 204, is at least partially insulated from the exhaust gas in the pipe 206.

At least the second portion 224 of the housing 210 advantageously is configured to have a sufficient mass, surface area, and thermal conductivity such that the housing 210 maintains a relatively stable temperature when exposed to the temperature of the region 208 outside of the environment 206. Because the housing 210 is in a substantially steady-state condition, excess latent heat in the probe unit 202 can promptly dissipate, since a temperature of the housing 210 is lower than a temperature of the environment 206. This enables sub-second oscillations in the temperature of the environment to induce detectable changes in the temperature of the probe unit 202. The housing 210 also at least partially insulates the sensor unit 204, and thus further enables use of conventional electronic connection and packaging practices without risking damage or inaccurate measurements.

Figure 3:
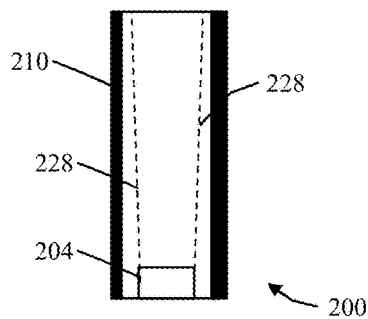
Figure 4:
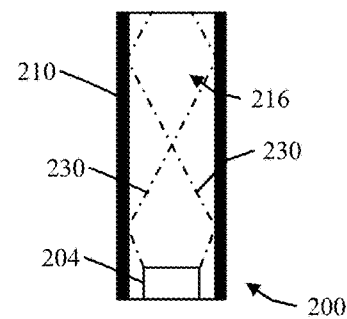

In an example, the probe unit 202 emits infra-red radiation due to its temperature, and the sensor unit 204 includes an infra-red sensor configured to detect infra-red radiation within a certain detection angle relative to the sensor. FIG. 3 illustrates an exemplary embodiment of the device 200 wherein the sensor unit 204 has a narrow detection angle illustrated by the detection lines 228, which extend from the sensor unit 204 but do not touch the housing 210. FIG. 4 illustrates an exemplary embodiment wherein the housing 210 includes a reflective material such that at least a portion of infra-red radiation emitted by the probe unit 202 is reflected along the interior 216 by the reflective material in the housing 210 and is directed towards the sensor unit 204, which has a wide detection angle as illustrated by the detection lines 230 which impinge upon and are reflected by the housing 210. In an example, the housing 210 includes a metal. In another example, the interior 216 of the housing 210 is coated or lined with a reflective material.

Figure 5:
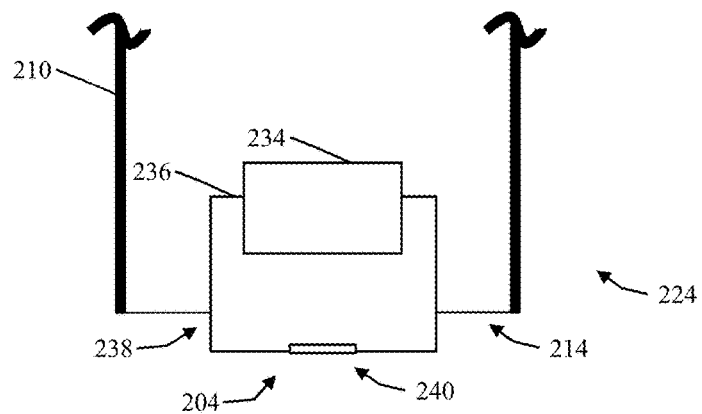
FIG. 5 is a schematic illustration of a sensor portion of a temperature sensing device according to the disclosure.

FIG. 5 illustrates an exemplary embodiment of the second portion 224 of the housing 210. As illustrated in FIG. 5, the sensor unit 204 includes an infra-red sensor 234 mounted onto the side of the second end 214 via a spacer 236 and configured to generate the electrical signal indicative of the temperature of the probe unit 202. In an example, the spacer 236 is inserted into and thus closes off a cavity 238 in of the second end 214 of the housing 210. As examples, the spacer 236 may be press-fitted, screwed into, snapped, welded, glued, or bolted to the housing 210. In particular, the spacer 236 can include threads configured to mate and engage with corresponding threads located along the cavity 238, although any suitable method of mounting the spacer 236 within the housing 210 may be used.

In one aspect, the spacer 236 includes an insulating material and is configured to at least partially insulate the sensor 234 from high temperatures. In an example, the spacer 236 includes a material such as, for example, a ceramic, a plastic, or glass. In one aspect, the spacer 236 further includes an electronic connection 240 that is configured to electronically connect the sensor 234 to, for example, a processor (see, e.g., the processor 306 in FIG. 7) for determining a sensed temperature of the environment 206 that corresponds to the electrical signal generated by the sensor 234. In other embodiments, an electrical connection for connecting the sensor 234 passes through an aperture in the housing 210.

Installation of the device 200 can be accomplished, for example, by inserting the housing 210 into the aperture 218 of the pipe 206 (FIG. 2), and then inserting the spacer 236 with the sensor 234 mounted thereon into the cavity 238 in the housing 210 (FIG. 5). Other installation processes are also contemplated, including wherein the sensor unit 204 is included within the housing 210 prior to installing the housing 210 in a desired location.

Figure 6:
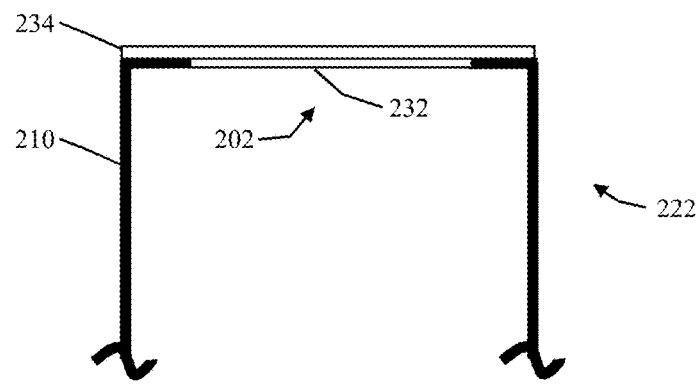
FIG. 6 is a schematic illustration of a probe portion of a temperature sensing device according to the disclosure.

FIG. 6 illustrates an exemplary embodiment of the first portion 222 of the housing 210. In one aspect, the probe unit 202 includes a thin metallic film 232 that has a high thermal conductivity such that changes in the temperature of the environment 206 (FIG. 2) that are small in magnitude relative to a magnitude of the temperature of the environment 206 induce a change in the temperature of the probe unit 202 that is detectable by the sensor unit 204. In other words, the thin metallic film 232 has a low time constant for heat absorption/radiation, such that the temperature of the probe unit 202 tracks the temperature of the exhaust gas, even for sub-second temperature fluctuations such as temperature changes occurring within a time period on the order of milliseconds.

Because the first portion 222 of the housing 210 is located within the environment 206, in some embodiments, material from the environment 206 can build up on the first portion 222 or the probe unit 202. For example, under some conditions, soot particulates from exhaust gasses can accumulate so as to completely cover the first portion 222 or the probe unit 202. Advantageously, such soot particulate accumulation does not impact performance of the device 200, and can even improve heat absorption by the probe unit 202.

In an embodiment, the first portion 222 includes a preconditioner 234, such as a layer of carbon or soot disposed over outside surfaces of the probe unit 204 or the first portion 222 which are exposed to the environment 206. The preconditioner 234 facilitates stable heat absorption characteristics over time.

Figure 7:
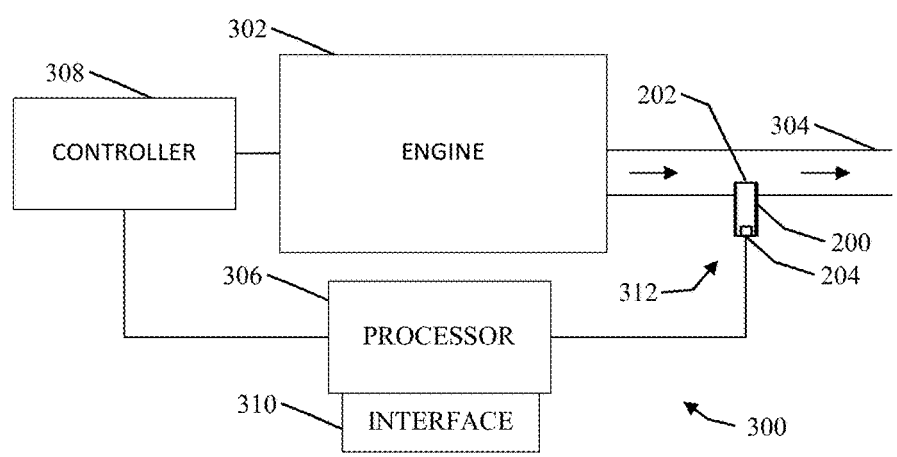
FIG. 7 is a schematic block diagram of a temperature measuring system according to the disclosure.

FIG. 7 illustrates a schematic block diagram of an exemplary temperature measuring system 300 for use with an engine 302 having an exhaust pipe 304 configured to exhaust gas generated by the combustion engine 302. The engine 302 can be, for example, a combustion engine, a compression engine, or combinations thereof. The system 300 includes a temperature sensing device 200 (FIG. 2) that is positioned within the exhaust pipe 304 as described above, and is operable to determine a temperature of exhaust gas exhausted from the engine 302 through the exhaust pipe 304.

The temperature sensing device 200 includes a sensor unit 204 that generates an electronic signal indicative of a temperature of a probe unit 202, and is operatively connected to a processor 306 via an electrical connection 312. The processor 306 is configured to determine a sensed temperature of the exhaust gas in the exhaust pipe 304 with reference to the electronic signal generated by the sensor unit 204. The processor 306 is also operatively connected to an engine controller 308, and is configured to provide the engine controller 308 with exhaust gas temperatures and other information such as changes to exhaust gas temperatures over time.

In this embodiment, the system 300 also includes an interface 310 operatively coupled to the processor 306, and configured to provide input of additional information to the processor 306. In an example, the interface 310 can be a user interface by which a user can select one or more settings.

The engine controller 308 is operatively connected to the engine 302, and is configured to control the engine 302 with reference to information provided by the processor 306. In one embodiment, the processor is configured to determine temperatures of the exhaust gas on a cycle-by-cycle basis, wherein each cycle is a time period on the order of milliseconds. The engine controller 308 is further configured to control the engine 302 on a cycle-by-cycle basis. Cycle-by-cycle measurements facilitate implementation via the engine controller 308 of advanced combustion strategies such as Homogeneous Charge Compression Ignition (HCCI) and Spark Assisted Compression Ignition (SACI).

While the operative connections between components of the system 300 are illustrated as lined connections, it should be understood that such connections can be, for example, hard-wired connections, wireless connections transmitted via, for example, an antenna and receiver, or combinations thereof.

While several embodiments are described above for sensing the temperature of exhaust gasses exhausted from an engine, it should be appreciated that the temperature sensing device described above is usable in a wide variety of applications that involve a harsh or extreme environment that may otherwise damage a conventional sensor or which requires measuring the temperature of the environment in time periods on the order of milliseconds. For example, the temperature sensing device disclosed herein may be used in applications for power plants, distilleries, chemical plants, oil wells, and other industrial and mechanical applications.

Figure 8:
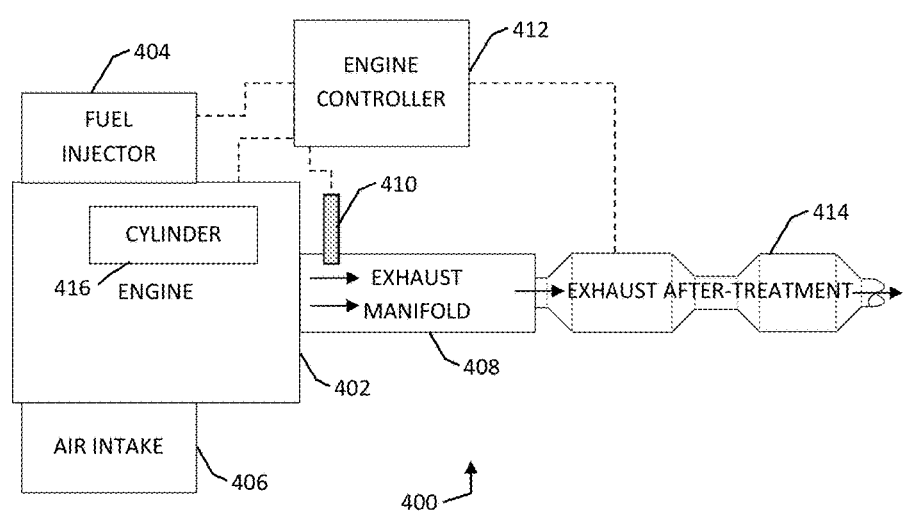
FIG. 8 is a schematic block diagram of an exemplary embodiment of a control system for an internal combustion engine according to this disclosure.

FIG. 8 is a schematic block diagram of an exemplary control system 400 for an internal combustion engine that is configured for cycle-by-cycle control. The control system 400 includes an engine 402, a fuel injector 404, an air intake 406, an exhaust manifold 408, a temperature sensor 410, an engine controller 412 and an exhaust after-treatment 414.

The fuel injector 404 is operable to supply the engine 402 with fuel, and the air intake 406 is configured to supply the engine 402 with air. The fuel and air supplied by the fuel injector 404 and air intake 406 results in an air/fuel mixture that is combusted by the engine 402 to, for example, produce an output torque. As discussed above, different ratios between air and fuel in the mixture, as defined by a lambda value, determine whether the resulting mixture is lean or rich, and can affect the operation of the engine 402 as well as the characteristics of the exhaust gas exhausted by the system 400. Therefore, precise control of the lambda value of the exhaust gas would be beneficial.

The combustion generally takes place in engine cylinders. In this embodiment, the engine 402 includes a single cylinder 416, but in different embodiments, the engine 402 can include any number of cylinders or banks of cylinders. Such combustion results in exhaust gas which is exhausted from the engine 402 via the exhaust manifold 408. The exhaust after-treatment 414 can optionally be included downstream of the exhaust manifold 408 in order to, for example, remove particulates or soot from the exhaust gas, capture, reduce or convert substances contained within the exhaust gas, or recirculate at least a portion of the exhaust gas into the engine, or the like.

The exhaust gas passing through the exhaust manifold 408 can be used to determine characteristics of the air/fuel mixture of the engine 402. For example, in known engine control systems, a lambda probe that senses a quantity of oxygen remaining in the exhaust gas after the combustion is used to determine that the air/fuel mixture of an engine is either lean or rich. However, lambda sensors generally have a response time that is too long to enable cycle-by-cycle control of an internal combustion engine, and thus control systems relying on lambda probes result in cycle-by-cycle combustion variations which can negatively impact the operation of the engine and result in undesired characteristics of the exhaust gas.

Sensing the temperature of the exhaust gas has also been used to determine characteristics of the air/fuel mixture, since fluctuations of the temperature of the exhaust gas can be indicative of a shift between an air/fuel mixture for the engine being lean and rich. However, conventional temperature sensors that have a response time fast enough to enable cycle-by-cycle measurements generally require expensive and complex modification and/or packaging in order to withstand the harsh environment created by the exhaust gas. The cyclical operation of the engine also generally results in significant signal noise that is filtered and post-processed in order to achieve a workable temperature reading. Therefore, a control system that does not require significant packaging and that does not require substantial filtering and post-processing would be beneficial.

The engine controller 412 is operatively connected to the engine 402, the fuel injector 404, and the temperature sensor 410, and can also be operatively connected to the exhaust after-treatment 414. The temperature sensor 410 is configured to generate a signal indicative of a temperature of the exhaust gas passing through the exhaust manifold 408, and has a fast response time that is on the order of milliseconds. In other words, the temperature sensor 410 has a thermal time constant that enables cycle-by-cycle temperature measurements of the exhaust gas passing through the exhaust manifold 408. The engine controller 412 is configured to operate the engine 402 on a cycle-by-cycle basis with reference to the temperature of the exhaust gas sensed by the temperature sensor 410.

In this embodiment, the fast response time of the temperature sensor 410 enables the engine controller 412 to determine the temperature of the exhaust gas passing through the exhaust manifold 408 during each engine cycle or combustion cycle. In some embodiments, the temperature is determined for a grouping of cycles, such as when a plurality of cylinders is arranged in a common bank, or when the engine 402 is operating at a high RPM, as discussed below.

Exhaust gas from the engine 402 is exhausted into the exhaust manifold 408 on a cycle-by-cycle basis. In other words, exhaust gas from a particular cycle is present within the exhaust manifold 408 during a time period, i.e. a sensing "window" before being replaced by exhaust gas exhausted during a subsequent cycle. This window is defined by the timing of the cylinder(s) and exhaust valve(s) in the engine 402 and the arrangement of the temperature sensor 410 in relation to the exhaust manifold 408.

In order to determine a temperature of the exhaust gas for a particular cycle that is not diluted by exhaust gas of a subsequent or preceding cycle, the temperature is measured only within the window, and thus the temperature sensor 410 is configured to have a response time that is less than the extent of the window. Because measurements of the temperature are based only upon the portions of the signal generated during the window, a signal-to-noise ratio of the signal generated by the temperature sensor 410 is improved relative to un-windowed sensor measurements. In other words, by only measuring the temperature at the periods of time within the window, instabilities and other noise in the signal due to the operation of the engine 402 that occur outside of the window are not considered, and thus have a lessoned impact on the signal considered by the engine controller 412. In an example, the signal generated by the temperature sensor 410 needs less or does not need the type of filtering generally required when taking temperature readings of exhaust gasses from an internal combustion engine.

Since the window is defined in part due to the timing of the engine cylinder(s) and exhaust valve(s), the extent of the window changes when the engine 402 is operated at different rates. In an embodiment, when the engine 402 is operated such that the extent of the window is less than the response time of the temperature sensor 410, for instance when the engine 402 is operated at a high RPM such as 10,000 RPM or more, the engine controller 412 is further configured to determine a temperature of the exhaust gas in the exhaust gas manifold 408 over the course of a plurality of cycles such that the combined window of the plurality of cycles is greater than or equal to the response time of the temperature sensor 410. The temperature sensor 410 can also be arranged in relation to the exhaust manifold 408 in order to maximize a potential extent of the window.

The engine controller 412 is configured to selectively operate the engine 402 in a first state and a second state. This first state corresponds to the normal operation of the engine 402, and when operating the engine 402 in the first state, the engine controller 412 is configured to operate the fuel injector 404 to inject a quantity of fuel into the engine during each engine cycle based on an open loop fuel mass command value. The open loop fuel mass command value indicates an amount of fuel to be injected into the engine during a normal engine cycle. The command value is an "open loop" command value, and thus the system 400 does not include any active control of the command value while the engine 402 is operating in the first state. However, if the air/fuel mixture for the engine 402 approaches an undesirable proportion, the operation of the engine 402 and the characteristics of the exhaust gas may be negatively impacted. As discussed above, even small fluctuations of the lambda of the air/fuel mixture can negatively impact performance and other factors. Therefore, the engine controller 412 is configured to selectively operate the engine 402 in the second state in order to regulate the lambda value of the air/fuel mixture.

When operating the engine 402 in the second state, the engine controller 412 is configured to perturb the quantity of fuel injected by the fuel injector during an engine cycle in order to determine characteristics of the air/fuel mixture during operation of the engine 402 in the first state. This is accomplished, for example, by injecting an additional amount of fuel along with the quantity indicated by the open loop fuel mass command value. The additional amount is generally small relative to the quantity of fuel injected during a normal engine cycle, such that the operation of the engine 402, composition of the exhaust gas, and proportion of the air/fuel mixture do not significantly change. In an example, the additional amount is equal to about 1% to about 5%, or more particularly approximately 2.5%, of the quantity of fuel injected during a normal engine cycle. In an example, in an internal combustion engine where the air/fuel mixture is supplied in a 10 to 1 ratio of air to fuel, adding approximately 2.5% more fuel would only change the air/fuel ratio to approximately 9.76 to 1.

Even when the perturbation is small, the additional amount of fuel results in a detectable temperature difference in the exhaust gas relative to the temperature of the exhaust gas in a normal engine cycle. This temperature difference is indicative of the characteristics of the air/fuel mixture of the engine 402. Because this temperature change is driven by the active perturbation of the quantity of fuel, rather than merely sensing variations in temperature from cycle to cycle, this configuration provides for a temperature measurement with a much higher signal-to-noise ratio than conventional cycle-to-cycle temperature variation-based control systems.

When the mixture is lean, and there is an excess of oxygen entering the engine 402, the additional amount of fuel is burned, and results in a detectable increase in the temperature of the exhaust gas passing through the exhaust manifold. Conversely, when the mixture is stoichiometric or rich, all of the oxygen entering the engine 402 is consumed, and the additional fuel remains at least partially unburned, and the temperature of the exhaust gas stays approximately the same or drops by a relatively small amount.

Figure 9:
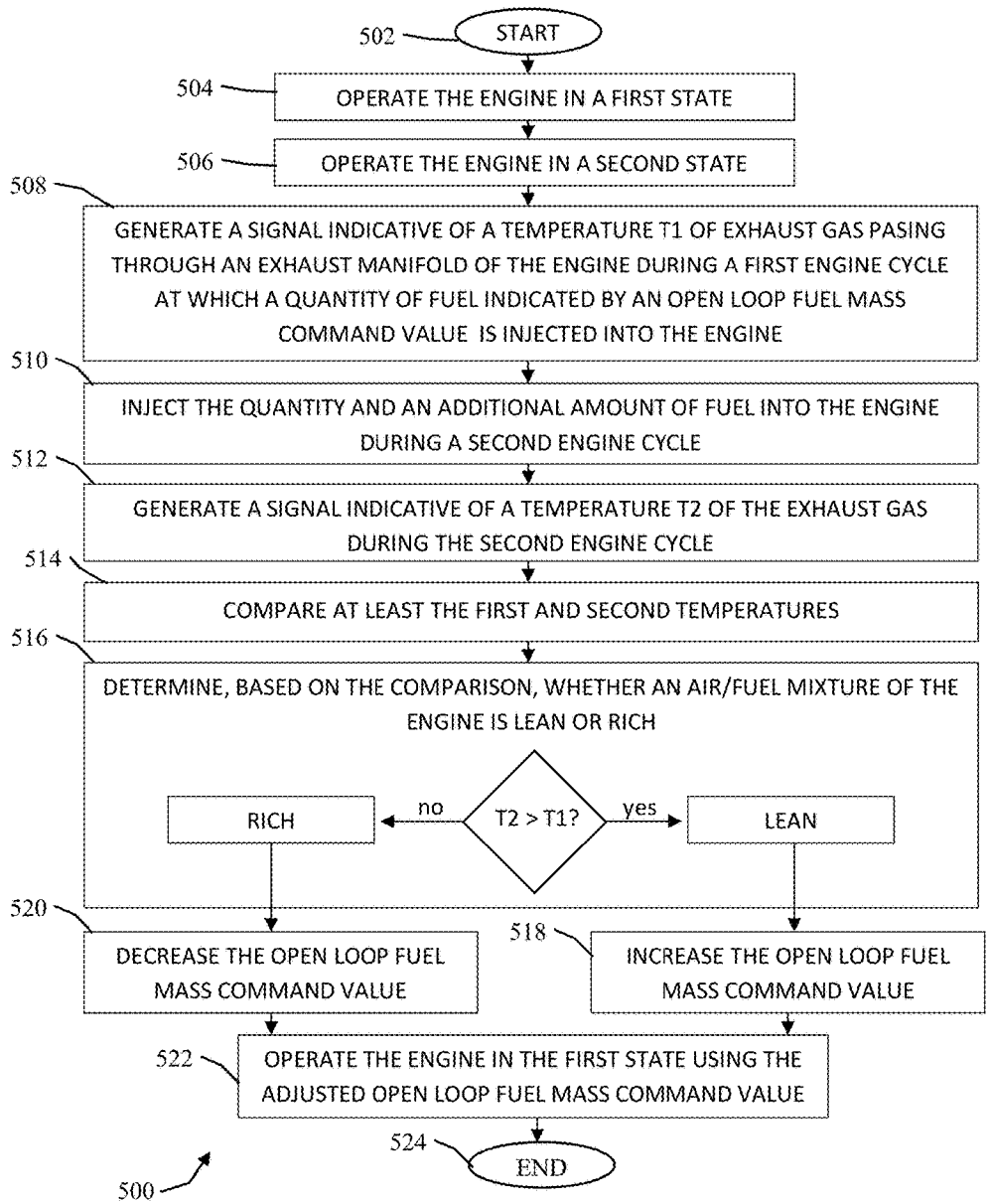
FIGS. 9 and 10 are flow diagrams of different exemplary control methods for an internal combustion engine according to this disclosure.

FIG. 9 illustrates an exemplary flow diagram of a method 500 for operating an internal combustion engine by an engine controller according to this disclosure. The method starts at 502, and at 504, the engine controller is operating the engine in the first state, whereat the engine controller operates a fuel injector of the engine to inject a quantity of fuel into the engine during each engine cycle as indicated by an open loop fuel mass command value. At 506, the engine controller begins operating the engine in the second state, and at 508, a temperature sensor generates a signal indicative of the temperature of exhaust gas passing through an exhaust manifold of the engine during a first engine cycle at which the quantity of fuel indicated by the open loop fuel mass command value is injected into the engine. At 510, the engine controller operates the fuel injector to inject both the quantity of fuel indicated by the open loop fuel mass command value and an additional amount of fuel into the engine for a second engine cycle, and at 512, the temperature sensor generates a signal indicative of the temperature of the exhaust gas during the second engine cycle. At 514, the engine controller compares at least the first temperature and the second temperature, and at 516, the engine controller determines, based on the comparison, whether the air/fuel mixture for the engine is lean or rich. Specifically, when the second temperature is greater than the first temperature, the engine controller determines that the air/fuel mixture is lean and the method proceeds to 518, and when the first temperature is greater than the second temperature, the engine controller determines that the air/fuel mixture is rich and the method proceeds to 520.

At 518, and 520 respectively, the engine controller adjusts the open loop mass fuel command value, thereby changing the quantity of fuel injected into the engine when operating in the first state and regulating the lambda value of the air/fuel mixture of the engine. In this embodiment, the adjustment is configured to regulate the air/fuel mixture towards a stoichiometric proportion. Thus, when the engine controller determines at 516 that the air/fuel mixture is lean, at 518 the engine controller increases the open loop fuel mass command value, so that the quantity of fuel to be injected during a normal engine cycle is increased. Conversely, when the engine controller determines at 516 that the mixture is rich, at 520 the engine controller decreases the command value, so that the quantity of fuel to be injected during a normal engine cycle decreases. However, in other embodiments, the engine controller may be configured to regulate the air/fuel mixture toward being lean or rich, rather than toward a stoichiometric proportion.

After 518 or 520, the method then proceeds to 522, whereat the engine controller returns to operating the engine in the first state using the adjusted open loop fuel mass command value, and at 524 the methodology ends. In an embodiment, the method is iterated, such that the engine controller is configured to alternate between operating the engine in the first state and the second state for each successive engine cycle. Even though such alteration means that the quantity of fuel injected during successive cycles fluctuates by at least the additional amount from cycle to cycle, the additional amount, as discussed above, is small relative to the quantity of fuel, and thus the variation from cycle to cycle induced by the additional fuel does not significantly affect the operation of the engine or the composition of the exhaust gas.

In another embodiment, the engine may be operating at a rate whereat the window provided by a single engine cycle is shorter than the response time of the temperature sensor. Method step 508 can be repeated at least once over a plurality of successive first engine cycles so that the window provided by the plurality of first engine cycles is at least as long as the response time of the temperature sensor, and the first temperature compared by the engine controller at 514 can be a time-averaged value based on the signal generated by the temperature sensor over the plurality of first engine cycles. Similarly, method steps 510 and 512 can be repeated over a plurality of successive second engine cycles, and the second temperature compared by the engine controller at

514 can be a time-averaged value based on the signal generated by the temperature sensor over the plurality of second engine cycles.

In a further embodiment, the engine controller is configured to execute the method and switch the operation of the engine from the first state to the second state at periodic intervals. For instance, the engine controller can be configured to execute the above method once every 5, 10, or 100 engine cycles, or once every second, ever 30 seconds, or every minute. The engine controller can also be configured to execute the method in response to a command signal. For example, another sensor may determine that an operating characteristic of the engine or a composition characteristic of the exhaust gas is undesirable, and generate a signal that causes the engine controller to execute the method. In another embodiment, the engine controller is configured to execute the method at various times according to a predetermined open loop injection map, or in response to on-line tuning of the engine. The engine controller can also be configured to execute the method for diagnostic purposes, fault detection, or other purposes.

Figure 10:
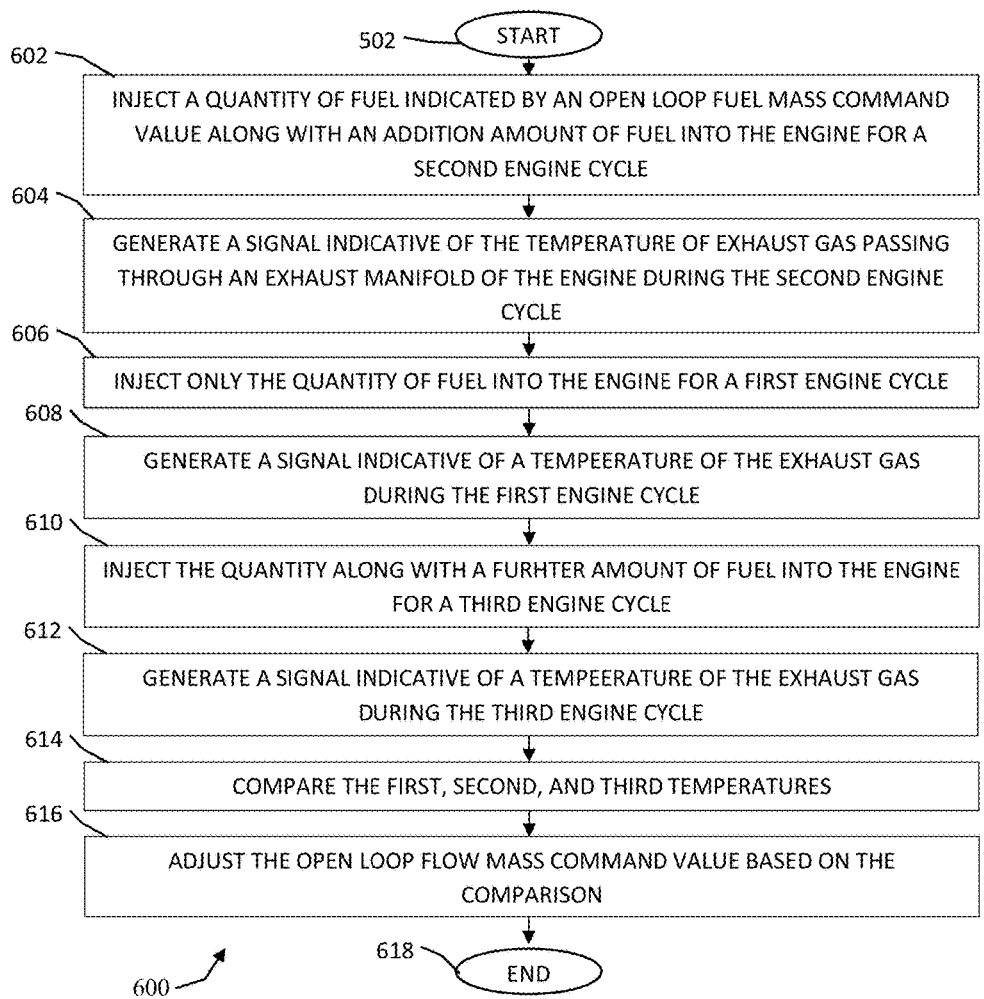

While perturbing the fuel quantity injected in a normal engine cycle by a single additional amount, as discussed above, results in a temperature difference indicative of characteristics of the air/fuel mixture of the engine, it may be beneficial to further perturb the quantity by a further amount, resulting in a further temperature difference that, in conjunction with the temperature difference described above, is further indicative of the characteristics of the air/fuel mixture of the engine. FIG. 10 illustrates another exemplary flow diagram of a method 600 for operating an internal combustion engine by an engine controller according to this disclosure, where like elements are referred to by like numerals, but in contrast to the method 500, the method 600 includes a further perturbation of the quantity of fuel injected during a normal engine cycle. In this method 600, the engine controller operates the engine in a pattern of: (i) a cycle that is similar to the second engine cycle discussed above with regard to the method 500, followed by (ii) a cycle that is similar to the first engine cycle of the method 500, followed by (iii) an additional third engine cycle as discussed below. Accordingly, the use of the indices "first", "second", and "third" in the method 600 is intended to indicate a type of cycle, rather than an ordering.

The method starts at 502, and at 602 the engine controller operates the fuel injector to inject both the quantity of fuel indicated by the open loop fuel mass command value and an additional amount of fuel into the engine for a second engine cycle. At 604, a temperature sensor generates a signal indicative of the temperature of exhaust gas passing through an exhaust manifold of the engine during the second engine cycle. At 606, the engine controller operates the fuel injector to inject only the quantity of fuel indicated by the open loop fuel mass command value into the engine for a first engine cycle, and at 608, the temperature sensor generates a signal indicative of the temperature of exhaust gas during the first engine cycle. At 610, the engine controller operates the fuel injector to inject both the quantity of fuel indicated by the open loop fuel mass command value and a further amount of fuel into the engine for a third engine cycle. At 612, the temperature sensor generates a signal indicative of the temperature of exhaust gas passing through an exhaust manifold of the engine during the third engine cycle. The further amount of fuel is greater than the additional amount of fuel. At 614, the engine controller compares the first temperature, second temperature, and third temperature. At 616, the engine controller adjusts the open loop fuel mass command value based on the comparison, and at 618, the method concludes.

Figure 11:
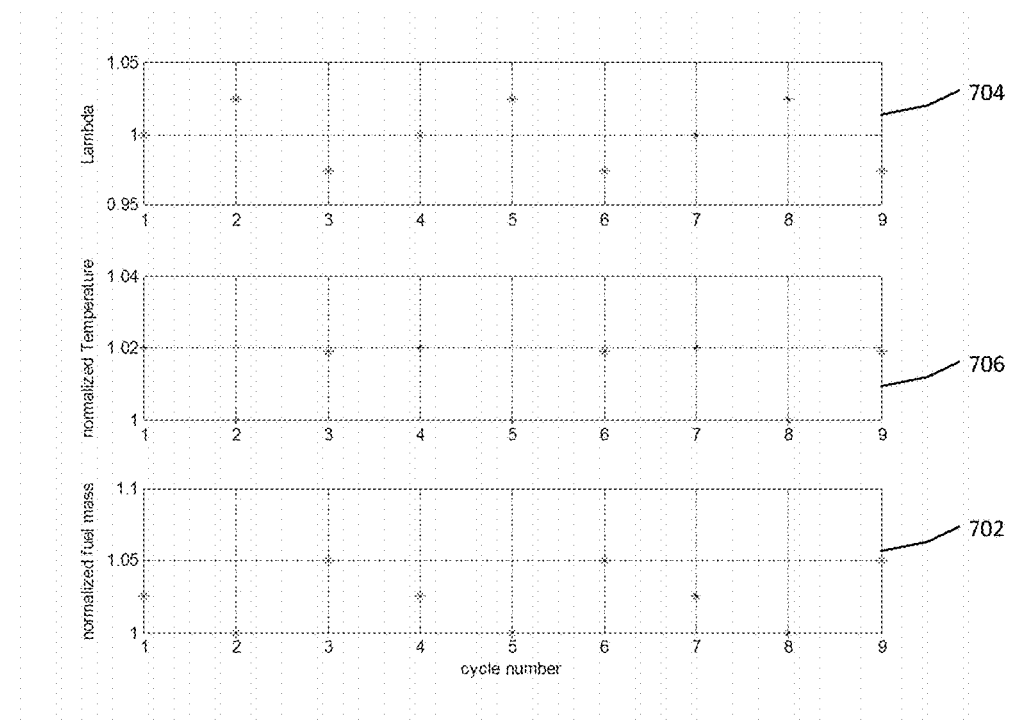
FIG. 11 is an illustration of simulation results for an engine being controlled according to the method of FIG. 10.

Comparing the third temperature along with the first and second temperature further indicates characteristics of the air/fuel mixture of the engine. The further amount can also be used as an additional regulation control of the air/fuel mixture of the engine. FIG. 11 illustrates simulation results for an engine being controlled via the first, second, and third engine cycle method 600 illustrated in FIG. 10. As described in further detail below, in this configuration, the open loop mass fuel command value is regulated to be slightly lean so that as the engine cycles through the first, second, and third cycles, the time-averaged lambda value of the air/fuel mixture for the engine is approximately equal to 1.

In FIG. 11, the horizontal axis represents an index of successive engine cycles, with cycle 2 following cycle 1, and etc. In plot 702, the vertical axis represents the normalized fuel mass injected into the engine. In plot 704, the vertical axis represents the lambda value of the air/fuel mixture of the engine. In plot 706, the vertical axis represents the normalized temperature of the exhaust gas passing through an exhaust manifold of the engine. Cycles 2, 5, and 8 are first cycles, i.e. normal cycles of operation for the engine, and in plots 702 and 706, the values of the data points have been normalized such that the values for cycles 2, 5, and 8 are equal to 1.

The cycles 1, 4, and 7 are second engine cycles, whereat the quantity of fuel injected into the engine is increased by the additional amount, e.g., by approximately 2.5% as shown in plot 702 relative to the normal cycles 2, 5, and 8. The cycles 3, 6, and 9 are third engine cycles, whereat the quantity is increased by approximately 5% relative to the normal cycles due to the addition of the further amount of fuel.

As shown in plot 704, the engine is running lean in the normal cycles, 2, 5, and 8, as signified by the lambda values being greater than 1. The additional amount of fuel in cycles 1, 4, and 7 decreases the lambda value to 1, and the further amount in cycles 3, 6, and 9 further decreases the lambda value below 1. Thus, the time-averaged lambda value oscillates about 1 when the lambda values of the second engine cycles are centered at a lambda value of 1. By adjusting the open loop mass fuel command value so that the lambda value of the second engine cycles 1, 4, and 7 are approximately 1, the time-averaged proportion of the air/fuel mixture of the engine can be held in a substantially stoichiometric proportion.

In this embodiment, control of the lambda values of the second engine cycles is achieved by adjusting the open loop mass fuel command value to regulate the quantity of fuel during the normal cycles 2, 5, and 8 so that a temperature difference between a second cycle 1, 4, or 7 and a first cycle 2, 5, or 8 is equal to a predefined value. The pre-defined value for the temperature difference is based on, for example, the amount of fuel in the additional and further fuel amounts, on the operating conditions of the engine, such as RPM, load, and on other factors.

In this embodiment, the predefined normalized temperature difference is approximately 0.02, i.e. a 2% difference. The comparison between the temperatures at 614 in FIG. 10 includes comparing the normalized second temperature and the normalized first temperature. When the normalized temperature difference is greater than the predetermined value, the normal air/fuel mixture is too lean, and the adjustment at 616 includes increasing the open loop fuel mass command value. When the normalized temperature difference is less than the predetermined value, the normal air/fuel mixture is too rich, and the adjustment at 616 includes decreasing the open loop fuel mass command value.

If the engine controller only alternated between first engine cycles with a lambda above 1, and second engine cycles with a lambda approximately equal to 1, the time-averaged lambda value for the air/fuel mixture of the engine would be greater than 1. By additionally including the third engine cycle in the alternation, where the third engine cycle has a rich air/fuel mixture with a lambda less than 1, the high lambda of the first cycles is balanced out, and the time-averaged lambda value of the engine approaches 1. The amount of fuel in the further fuel amount that is added in during the third cycles 3, 6, and 9 can be adjusted to counterbalance the high lambda values resulting from the lean air/fuel mixture in the normal cycles 2, 5, and 8 so that the engine is regulated towards stoichiometric operation.

Because the exhaust gas exhausted by an internal combustion engine can create a harsh environment that may present a risk of damage to temperature sensors, using a non-contact type temperature sensor may be beneficial. Non-contact temperature sensors, in contrast to thermocouples, do not require contact between a sensor and a point being measured, and provide at least some insulation or other protection of the sensor from the harsh environment.

Non-contact temperature sensors generally utilize an infrared sensor that senses infrared ("IR") radiation which is indicative of a temperature of a desirably measurement point. Objects at any non-zero temperature radiate electromagnetic energy which can be described either as electromagnetic waves or photons, according to the laws known as Planck's law of radiation, the Stefan-Boltzmann Law, and Wien's displacement law. Wien's displacement law states that the wavelength at which an object radiates the most ($\lambda$max) is inversely proportional to the temperature of the object as approximated by the following equation:

$$\lambda_{max}(\mu m) \approx \frac{3000}{T(K)}$$

For many objects at most non-extreme temperatures, most of the emitted electromagnetic radiation lies within in the infrared region, and thus infrared radiation is useful for sensing temperatures of many different objects. As discussed above, in the embodiment illustrated in FIG. 2, the probe unit 202 naturally emits infra-red radiation due to its temperature, and the sensor unit 204 includes an infra-red sensor configured to detect infra-red radiation within a certain detection angle relative to the sensor.

Two of the types of electromagnetic radiation detectors that can detect IR radiation are "photon detectors" and "thermal detectors". Most conventional non-contact temperature sensors include photon detectors which detect incident photons by using the energy of said photons to excite charge carriers in a material. The excitation of the material is then detected electronically. Thermal detectors also detect photons. Thermal detectors, however, use the energy of said photons to increase the temperature of a component. By measuring the change in temperature, the intensity of the photons producing the change in temperature can be determined.

In thermal detectors, the temperature change caused by incoming photons can be measured using temperature-dependent resistors (thermistors), the pyroelectric effect, the thermoelectric effect, gas expansion, and other approaches.

One advantage of thermal detectors, particularly for long wavelength infrared detection, is that, unlike photon detectors, thermal detectors do not require cryogenic cooling in order to realize an acceptable level of performance in many applications. However, customary non-contact IR sensors are generally too large, too expensive, or have a too slow response time for optimized use in an engine control system.

In one embodiment, the sensor unit 204 is a MEMS bolometer. Even though the etymology of the word "Bolometer" covers any device used to measure radiation, bolometers are generally understood to be to thermal detectors which rely on a thermistor to detect radiation in the long wavelength infrared window (8 $\mu$m-12 $\mu$m) or mid-wavelength infrared window (3 $\mu$m-5 $\mu$m).

Because bolometers must first absorb incident electromagnetic radiation to induce a change in temperature, the efficiency of the absorber in a bolometer relates to the sensitivity and accuracy of the bolometer. Ideally, absorption as close to 100% of incident electromagnetic radiation is desired. In theory, a metal film having a sheet resistance (in Ohms per square) equal to the characteristic impedance of free space, laying over a dielectric or vacuum gap of optical thickness d will have an absorption coefficient of 100% for electromagnetic radiation of wavelength 4d. The following equation shows the expression of the characteristic impedance (Y) of free space:

$$Y = \sqrt{\frac{\mu_0}{\varepsilon_0}}$$

wherein $\varepsilon_0$ is the vacuum permittivity and $\mu_0$ is the vacuum permeability.

The numerical value of the characteristic impedance of free space is close to 377 Ohm. The optical length of the gap is defined as "nd", where n is the index of refraction of the dielectric, air or vacuum.

In the past, micro-electromechanical systems (MEMS) have proven to be effective solutions in various applications due to the sensitivity, spatial and temporal resolutions, and lower power requirements exhibited by MEMS devices. One such application is as a bolometer. Known bolometers use a supporting material which serves as an absorber and as a mechanical support. Typically, the support material is silicon nitride. A thermally sensitive film is formed on the absorber to be used as a thermistor. The absorber structure with the attached thermistor is anchored to a substrate through suspension legs having high thermal resistance in order for the incident electromagnetic radiation to produce a large increase of temperature on the sensor.

A temperature change of an absorber of a bolometer due to absorption of incident radiation corresponds to a change in resistance of a thermistors material of the absorber. By measuring an output voltage resulting from applying a probe current across the absorber, the change in resistance in the absorber is determined. Using the correspondence between the change in resistance and the change in temperature of the absorber, the change in resistance of the absorber is used to make an inference about the incident radiation which corresponds to the desirably measured temperature.

Because the device 200 illustrated in FIG. 2 effectively seals off the sensor unit 204 from the harsh environment of the exhaust manifold 206, any acceptable type of bolometer is usable with the sensor unit 204. MEMS bolometers, which exhibit fast response times, are relatively simple to produce and which are readily sized to be positioned within the device 200 can be optimized for use with the device 200.

The configurations of a control system described above enable precise cycle-by-cycle control of the lambda value of the air/fuel mixture entering the engine. In another embodiment, the cycle-by-cycle temperature measurements of the exhaust gas also enable precise control of modulation of the exhaust gas after treatment 414 (FIG. 8), and can also be used for engine diagnostics, engine misfire detection, and other uses.

In one embodiment, an engine control system and method according to this disclosure is incorporated into a 2-wheeler vehicle. Emissions standards for 2-wheeler vehicles are generally more restrictive than for other types of vehicles, partly due to the types of engine used for such vehicles. The control system and method according to this disclosure enables operation of a 2-wheeler with reduced emissions, and also eliminates the need for a lambda sensor which can be expensive and difficult to maintain.

While several embodiments are described above for sensing the temperature of exhaust gasses exhausted from an engine, it should be appreciated that the temperature sensing device described above is usable in a wide variety of applications that involve a harsh or extreme environment that may otherwise damage a conventional sensor or which requires measuring the temperature of the environment in time periods on the order of milliseconds. For example, the temperature sensing device disclosed herein may be used in applications for power plants, distilleries, chemical plants, oil wells, and other industrial and mechanical applications.

In another exemplary embodiment according to this disclosure, a temperature sensing device includes a housing that has a first end portion and a second end portion opposite the first end portion. The first and second end portions define an interior of the housing. The housing is configured to be arranged with the first end portion located within an environment to be measured and the second end portion located outside the environment. A probe unit is attached to the first end portion and is configured to be exposed to the environment when the first end portion is located within the environment such that a temperature of the probe unit corresponds to a temperature of the environment. A sensor unit is attached to the second end portion and is spaced apart from the probe unit with the interior positioned therebetween, such that the sensor unit is configured to be positioned outside of the environment when the first end portion is located within the environment. The sensor unit is further configured to sense the temperature of the probe unit and generate an electrical signal indicative of the sensed temperature of the probe unit. Advantageously, the interior of the housing is sealed off from at least one of the environment and the region outside of the environment.

The probe unit is configured to emit radiation based on the temperature of the probe unit, and a surface of the interior of the housing can be configured to reflect at least a portion of the radiation emitted by the probe unit towards the sensor unit. In some embodiments, the probe unit includes a metallic film with a high thermal conductivity such that the temperature of the probe unit tracks the temperature of the environment with a response that is within the order of milliseconds. In some embodiments, the probe unit includes a carbon preconditioner.

The housing can include a metal, or any other acceptable materials. The housing can have a substantially tube-like shape or any other acceptable shape.

The environment can be, for example, a fluid flowing through a pipe, whereby the first end portion is configured to be inserted into the pipe.

The sensor unit is mounted to a side of the second end portion that faces the interior of the housing. The sensor unit includes at least one sensor mounted to the side of the second end that faces the interior via a spacer positioned in a cavity of the second end of the housing. The spacer can be configured to at least partially insulate the at least one sensor from the temperature of the environment. The sensor unit can include an infra-red sensor configured to sense the infra-red radiation emitted by the probe unit, whereby the electrical signal generated by the sensor unit is generated with reference to the sensed infra-red radiation. In some embodiments. the sensor unit is configured to connect, via an electrical connection, with a processor configured to determine a sensed temperature of the environment with reference to the electrical signal generated by the sensor unit.

Advantageously, the temperature sensing device has a time constant in the order of milliseconds.

In another exemplary embodiment according to this disclosure, a temperature measuring system for use with an engine having an exhaust pipe configured to exhaust gas generated by the engine includes a temperature sensing device, a processor, and an engine controller. The temperature sensing device includes a housing, a probe unit, and a sensor unit. The housing has a detection end that is at least partially inserted into the exhaust pipe, and a sensor end that is outside of the exhaust pipe, the detection end and the sensor end defining an interior. The probe unit closes off the detection end of the housing such that the probe unit is exposed to exhaust gas flowing through the exhaust pipe, and is configured to have a temperature that tracks a temperature of the exhaust gas. The sensor unit is mounted on a side of the sensor end of the housing that faces the interior, and is configured to sense the temperature of the probe unit and generate an electrical signal indicative of the sensed temperature of the probe unit. The processor is electronically connected to the sensor unit and is configured to determine a sensed temperature of the exhaust gas with reference to the electrical signal. The engine controller is operatively connected to the processor and the engine, and is configured to control the engine with reference to the sensed exhaust gas temperature on a cycle-by-cycle basis.

An exemplary method of sensing a temperature according to this disclosure includes introducing a first end portion of a housing of a temperature sensing device into an environment to be measured, the first end portion having a probe unit that closes off the end portion of the housing. A second end portion of the housing is positioned into a region outside of the environment, the second end portion being opposite the first end portion and having a sensor unit mounted on a side facing the probe unit. The probe unit is exposed to a temperature of the environment, such that a temperature of the probe unit corresponds to the temperature of the environment. The sensing unit senses the temperature of the probe unit, and an electrical signal is generated with reference to the sensed temperature of the probe unit, the electrical signal corresponding to a sensed temperature of the environment.

Exposing the probe unit to the temperature of the environment causes the probe unit to emit infra-red radiation. The sensor unit includes an infra-red sensor configured to sense the infra-red radiation emitted by the probe unit in order to sense the temperature of the probe unit.

The method can also include determining, via a processor, the sensed temperature of the environment, with reference to the electrical signal.

The probe unit can be configured such that a change in the temperature of the environment induces a change in the temperature of the probe within a time period on the order of milliseconds. The determination of the sensed temperature of the environment can be repeated for at least one following time period in order to collect cycle-by-cycle data of the temperature of the environment. An engine can be controlled with reference to the cycle-by-cycle data.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those of ordinary skill in the art that are also intended to be encompassed by the disclosure.

What is claimed is:

1. A control system for an internal combustion engine, comprising:
    a temperature sensor configured to generate a signal indicative of a temperature of exhaust gas passing through an exhaust manifold of the engine; and
    an engine controller configured to selectively operate the engine in:
        a first state, whereat the engine controller is configured to operate a fuel injector for the engine to inject a quantity of fuel into the engine corresponding to an open loop fuel mass command value; and
        a second state, whereat the engine controller is configured to:
            determine a first temperature of the exhaust gas based on the signal generated by the temperature sensor during a first engine cycle at which the quantity of fuel is injected into the engine;
            operate the fuel injector to inject the quantity of fuel along with an additional amount of fuel into the engine during a second engine cycle;
            determine a second temperature of the exhaust gas based on the signal generated by the temperature sensor during the second engine cycle;
            compare at least the first temperature and the second temperature; and
            adjust the open loop fuel mass command value based on the comparison.

2. The control system according to claim 1, wherein adjusting the open loop fuel mass command value includes increasing or decreasing the open loop fuel mass command value to regulate the quantity of fuel to be injected into the engine when operating in the first state toward a stoichiometric proportion.

3. The control system according to claim 1, wherein adjusting the open loop fuel mass command value includes:
    determining that an air/fuel mixture of the exhaust gas is lean and increasing the open loop fuel mass command value when the comparison indicates that the second temperature is greater than the first temperature; and
    determining that an air/fuel mixture of the exhaust gas is rich and decreasing the open loop fuel mass command value when the comparison indicates that the first temperature is greater than the second temperature.

4. The control system according to claim 1, wherein the temperature sensor is a non-contact sensor with a time constant on the order of milliseconds.

5. The control system according to claim 4, wherein the temperature sensor includes a bolometer.

6. The control system according to claim 5, wherein the temperature sensor includes:
    a housing that has:
        a first end portion; and
        a second end portion opposite the first end portion, the first and second end portion defining an interior of the housing;
        the first end portion configured to be inserted into the exhaust manifold and the second end portion located outside the exhaust manifold; and
    a probe unit that is attached to the first end portion and that is configured to be exposed to the exhaust gas when the first end portion is inserted into the exhaust manifold such that a temperature of the probe unit corresponds to a temperature of the exhaust gas, the probe unit being configured to emit radiation into the interior of the housing based on the temperature of the probe unit;
    wherein the bolometer is positioned within the second end portion of the housing, and is spaced apart from the probe unit;
    the bolometer being configured to:
        sense the radiation emitted by the probe unit; and
        generate a signal indicative of the temperature of exhaust gas based on the sensed radiation emitted by the probe unit.

7. The control system according to claim 1, wherein the engine controller is configured to alternate between operating the engine in the first state and operating the engine in the second state for each successive engine cycle.

8. The control system according to claim 1, wherein the engine controller is configured to alternate between operating the engine in the first state for a plurality of cycles, and operating the engine in the second state for a plurality of cycles.

9. The control system according to claim 8, wherein the plurality of cycles of operation in the first state and the plurality of cycles of operation in the second state each include a number of cycles such that the operation of the engine in each of the first and second state is longer than a response time of the temperature sensor.

10. The control system according to claim 1, wherein:
    the engine controller, when operating the engine in the second state, is further configured to:
        operate the fuel injector to inject the quantity of fuel along with a further amount of fuel during a third engine cycle, the further amount being greater than the additional amount; and
        determine a third temperature of the exhaust gas based on the signal generated by the temperature sensor during the third engine cycle; and
    the comparison includes comparing the first temperature, second temperature, and third temperature.

11. The control system according to claim 1, wherein the engine controller is further configured to:
    determine time-averaged values of the first temperature and of the second temperature over a plurality of first and second engine cycles, respectively; and
    adjust the open loop fuel mass command value based on the time-averaged values of the first temperature and the second temperature.

12. The control system according to claim 1, wherein the engine controller is configured to operate the engine in the second state at least one of (i) at regular intervals, (ii) in response to a command signal, and (iii) according to a predetermined sequence.

13. The control system according to claim 1, wherein:
the temperature sensor includes a plurality of temperature sensor units that are each configured to sense an exhaust gas temperature of a respective engine cylinder or bank of engine cylinders in the engine;
the open loop fuel mass command value includes a respective command value for each engine cylinder or bank of engine cylinders;
the engine controller is configured to selectively operate each engine cylinder or bank of engine cylinders in the engine in the first and second states with reference to the corresponding temperature sensing unit and command value.

14. A method of operating an internal combustion engine, comprising:
configuring a temperature sensor to generate a signal indicative of a temperature of exhaust gas passing through an exhaust manifold of the engine;
operating a fuel injector of the engine to inject a quantity of fuel into the engine during a first engine cycle, the quantity based on an open loop fuel mass command value;
determining a first temperature of the exhaust gas based on the signal generated by the temperature sensor during the first engine cycle;
operating the fuel injector to inject the quantity of fuel and an additional amount of fuel into the engine during a second engine cycle;
determining a second temperature of the exhaust gas based on the signal generated by the temperature sensor during the second engine cycle;
comparing at least the first temperature and the second temperature; and
adjusting the open loop fuel mass command value based on the comparison.

15. The method of claim 14, further comprising:
subsequent to adjusting the open loop fuel mass command value, operating the fuel injector to inject an adjusted quantity of fuel into the engine during a third engine cycle, the adjusted quantity based on the adjusted open loop fuel mass command value.

16. The method of claim 14, wherein adjusting the open loop fuel mass command value includes selectively increasing or decreasing the open loop fuel mass command value to regulate the quantity of fuel to be injected into the engine toward a stoichiometric proportion.

17. The method of claim 14, wherein adjusting the open loop fuel mass command value includes:
determining that an air/fuel mixture of the exhaust gas is lean and increasing the open loop fuel mass command value when the comparison indicates that the second temperature is greater than the first temperature; and
determining that an air/fuel mixture of the exhaust gas is rich and decreasing the open loop fuel mass command value when the comparison indicates that the first temperature is greater than the second temperature.

18. The method of claim 14, further comprising:
operating the fuel injector to inject the quantity of fuel and a further amount of fuel into the engine during a third engine cycle, wherein the further amount of fuel is greater than the additional amount of fuel; and
determining a third temperature of the exhaust gas based on the signal generated by the temperature sensor during the third engine cycle, wherein the comparison includes comparing the first temperature, second temperature, and third temperature.

19. The method of claim 14, further comprising:
operating the engine to alternatingly execute at least one first engine cycle and at least one second engine cycle, wherein:
the operating of the fuel injector to inject the quantity of fuel, and the determining of the first temperature is carried out for each first engine cycle;
the operating of the fuel injector to inject the quantity and the additional amount of fuel, and the determining of the second temperature is carried out for each second engine cycle; and
the comparing of the temperatures and adjusting of the open loop fuel mass command value is carried out prior to each alternation from the at least one second engine cycle to the at least one first engine cycle.

20. The method of claim 14, wherein the comparing of the temperatures and adjusting of the open loop fuel mass command value are carried out during the second engine cycle or prior to a successive first engine cycle.

* * * * *